United States Patent [19]
Chrokey et al.

[11] 3,794,309
[45] Feb. 26, 1974

[54] ADJUSTABLE STROKE SHOCK ABSORBER

[75] Inventors: William J. Chrokey; Larry C. Ellis, both of Farmington; Robert J. Heideman, Detroit, all of Mich.

[73] Assignee: Ace Controls, Inc., Farmington, Mich.

[22] Filed: Dec. 29, 1972

[21] Appl. No.: 319,289

[52] U.S. Cl. .............................. 267/34, 267/65 R
[51] Int. Cl. ............................................ F16g 5/00
[58] Field of Search .................. 267/34, 64 R, 65 R

[56] References Cited
UNITED STATES PATENTS
3,328,018  6/1967  Austgen .............................. 267/34
3,751,091  8/1973  Renneker ............................. 267/34

Primary Examiner—James B. Marbert
Attorney, Agent, or Firm—Robert G. Mentag

[57] ABSTRACT

An adjustable stroke shock absorber having an outer tube slidably mounted in an inner tube and with the inner tube having an outer end adapted to receive an impact load. A piston rod is fixed in the outer tube and is extended into the inner tube and carries a fixed piston head. The piston head is provided with a fluid return passage means and a check valve to close said passage means when the inner tube is moved into the outer tube during a shock absorbing movement. A seal is disposed in the inner tube in a position around the piston rod, and it is movable with the inner tube. The inner tube is provided with fluid whereby when a shock load is taken on the outer end of the inner tube, the inner tube will move into the outer tube and force the fluid therein around the fixed piston head and into a chamber behind the fixed piston head. After the shock load has been absorbed, a return spring moves the inner tube to the initial starting position.

12 Claims, 19 Drawing Figures

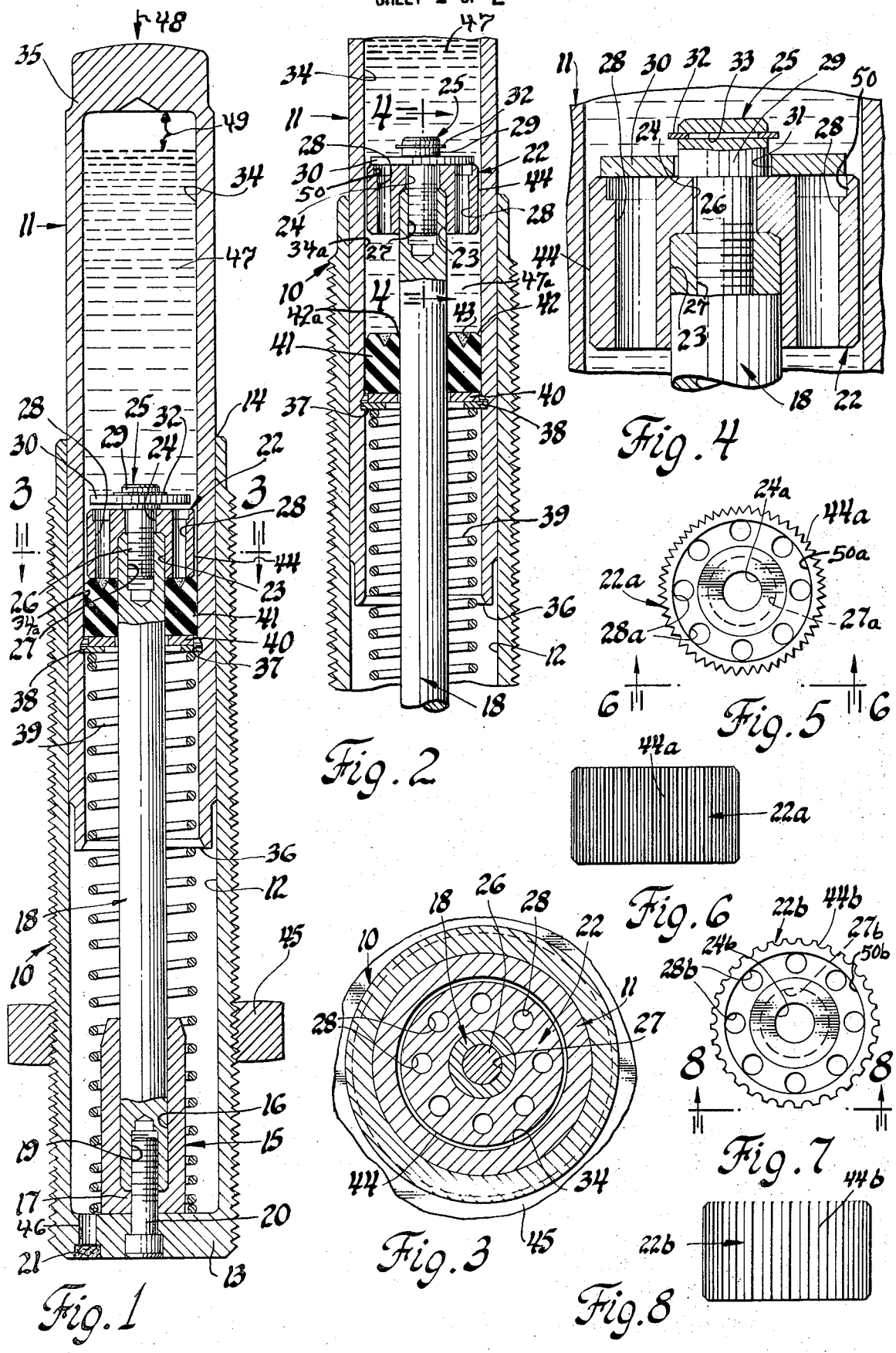

३,७९४,३०९

ADJUSTABLE STROKE SHOCK ABSORBER

SUMMARY OF THE INVENTION

This invention relates generally to the shock absorber art, and more particularly, to an adjustable stroke shock absorber with a self-contained accumulator.

It is an important object of the present invention to provide a novel and improved shock absorber which is constructed and arranged to provide an adjustable stroke shock absorber which can be adjusted to absorb various impact loads.

It is another object of the present invention to provide a novel and improved adjustable stroke shock absorber which is simple and compact in construction, economical to manufacture, and efficient in operation.

It is still another object of the present invention to provide a novel and improved adjustable shock absorber which is provided with a built-in accumulator.

It is a further object of the present invention to provide a novel and improved adjustable stroke shock absorber which includes an outer tube and an inner tube slidably mounted in the outer tube, a piston rod disposed in said tubes with a rear end fixed to the closed inner end of the outer tube and having a front end extended into the inner tube, a piston head fixed on the front end of said piston rod and having the outer peripheral surface thereof spaced from the surface of the chamber in the inner tube to form a ring-shaped metering orifice therebetween, a resilient rod seal slidably mounted about said piston rod on the rear side of said piston head, means for retaining said resilient rod seal in said inner tube, return passage means formed through said piston head to communicate the portion of the inner tube chamber in front of the piston head with the portion of the inner tube chamber to the rear of the piston head, check valve means operatively mounted on the front end of said piston head and movable to a closed position over the outer end of said fluid passage means and to an open position spaced apart from the outer end of said passage means, said inner tube carrying a volume of fluid, and return means operatively mounted in said outer tube for returning said inner tube from an inward position in the outer tube after a shock absorbing stroke to the initial shock absorbing position, whereby when an impact load is received on the outer closed end of the inner tube, the fluid in the inner tube will be pressurized and will flow around the fixed piston head as the inner tube moves into the outer tube and to a position to the rear of the piston head, and after the inner tube has reached the inner end of its shock absorbing stroke, said return means will move the inner tube outwardly of the outer tube so as to force the fluid through said return means and move said check valve means to the open position to permit the fluid to flow back to its initial position in front of the piston head.

Other features and advantages of this invention will be apparent from the following detailed description, appended claims, and the accompanying drawings.

BRIEF DESCRIPTION OF THE DRAWINGS

FIG. 1 is an elevational, section view of an adjustable stroke shock absorber made in accordance with the principles of the present invention.

FIG. 2 is a fragmentary, elevational view of the structure illustrated in FIG. 1, and showing the shock absorber structure during a shock absorbing movement.

FIG. 3 is a slightly enlarged, horizontal section view of the structure illustrated in FIG. 1, taken along the line 3—3 thereof, and looking in the direction of the arrows.

FIG. 4 is a fragmentary, enlarged, elevational section view of the structure illustrated in FIG. 2, taken along the line 4—4 thereof, and looking in the direction of the arrows.

FIG. 5 is a top plan view of a modified piston head employed in the invention.

FIG. 6 is a side elevational view of the piston head illustrated in FIG. 5, taken along the line 6—6 thereof, and looking in the direction of the arrows.

FIG. 7 is a top plan view of another modified piston head employed in the invention.

FIG. 8 is an elevational view of the piston head illustrated in FIG. 7, taken along the line 8—8 thereof, and looking in the direction of the arrows.

DESCRIPTION OF THE PREFERRED EMBODIMENTS

Figure 9:
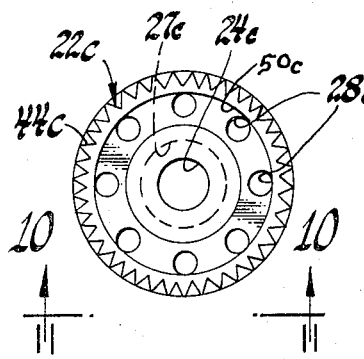
FIG. 9 is a top plan view of still another piston head employed in the invention.

Referring now to the drawings, and in particular to FIG. 1, the numeral 10 generally designates an outer tube or housing which is threaded on the outer cylindrical surface thereof for threadably fixing the outer tube in an operative shock absorbing position. The numeral 11 generally designates an inner tube which is slidably mounted with the outer tube 10. The outer tube 10 is provided with a longitudinally extended interior chamber 12 which is closed at the rear or lower end of the tube 10 by an end wall 13. The front end 14 of the outer tube 10 is open for the sliding reception of the inner tube 11. The outer tube 10 and the inner tube 11 are made from a suitable hardened steel and the outer cylindrical surface of the inner tube 11 is a bearing surface and is slidable directly on and guided by the inner bearing surface of the outer tube 10 which is the surface of the chamber 12.

As shown in FIG. 1, a cylindrical spring guide 15 is mounted on the inner surface of the outer tube end wall 13. The spring guide 15 is provided with an axial bore 16 which extends inwardly from the inner end of the guide to an end wall 17 which closes off the rear end of the bore 16. The front end outer periphery of the spring guide 15 is chamfered for spring guidance. An elongated, cylindrical piston rod 18 is disposed axially within the outer tube 10 and its rear or lower end is slidably mounted within the bore 16 in the spring guide 15. The rear end of the piston rod 18 is provided with an inwardly extended threaded bore 19 which receives a rod retaining screw 20 that is mounted through a suitable stepped bore formed through the outer tube end wall 13. It will be seen that the retainer screw 20 retains the spring guide 15 and the piston rod 18 in their respective axial working positions in the outer tube 10.

As shown in FIG. 1, the rear end of the interior chamber 12 in the outer tube 10 is connected to the atmosphere or to the exterior of the tube 10 through a stepped bore 46 formed in the outer tube end wall 13. Seated in the enlarged outer end of the bore 46 is a bronzed, porous, sintered filter which is press-fitted in place, and which permits air to flow in and out of the rear end of the chamber 12 to prevent the shock absorber from being air-bound.

As shown in FIGS. 1, 2 and 4, the piston rod 18 has fixedly mounted on its upper end, a piston head generally indicated by the numeral 22. The upper end of the piston rod 18 is slidably mounted in an axial bore 23 which is formed in the rear or lower end of the piston head 22 and it extends axially inward. A second axial bore 24 is formed in the front end of the piston head 22 and it extends axially inward and communicates with the bore 23. The piston rod 18 is fixedly secured to the piston head 22 by a piston head retainer generally indicated by the numeral 25.

The piston head retainer 25 includes an enlarged head 29 which is seated against the outer face of the piston head 22. The piston head retainer 25 further includes an integral, inwardly extended shaft 26 which is integral with the enlarged cylindrical head 29, and which extends inwardly through the bore 24 and into a threaded engagement in a threaded bore 27 formed in the front end of the piston rod 18. As best seen in FIGS. 3 and 4, the piston head 22 is provided with a plurality of circularly disposed fluid return passages or bores 28 which extend axially through the piston head 22. As shown in FIG. 4, the outer ends of the fluid return passages 28 terminate in an annular groove 50.

As best seen in FIG. 4, the enlarged head 29 of the piston head retainer 25 forms a shaft for a flat check valve 30 which is adapted to enclose the groove 50 and the outer ends of the fluid return passages 28 during a shock absorbing stroke. The check valve 30 is a flat washer type valve with an axial bore 31 for slidably mounting the check valve 30 over the check valve shaft member 29. The check valve 30 is adapted to slide upwardly and downwardly on the shaft member 29 but is retained in place by a releasable snap ring retainer 32 which is seated in a peripheral groove 33 formed around the outer end of the shaft member 29.

As shown in FIG. 1, the outer end of the inner tube 11 is enclosed by a striking head 35 which has a rounded-off or crowned outer face so as to prevent mushrooming and expansion and binding of the inner tube 11 in the outer tube 10 due to continuous absorbing of the shock loads on the head 35. The numeral 34 in FIG. 1 indicates the upper chamber formed in the inner tube 11. The numeral 34a designates a lower chamber which comprises the rear or lower end of the chamber 34 on the rear side of the piston head 22. The numeral 36 designates the open lower or near end of the inner tube 11.

As shown in FIGS. 1 and 2, the surface of the lower chamber 34a is undercut, as indicated by the numeral 37, for the reception of a retainer ring 38. A return spring 39 is operatively mounted in the outer tube 10 and its lower end is seated against the inner face of the outer tube end wall 13. The upper end of the return spring 39 extends upwardly into the rear end of the inner tube 11 and it is seated against the retainer ring 38.

Seated on the upper face of the retainer ring 38 is a seal retaining washer 40 made from any suitable metal. Seated on the upper face of the seal retaining washer 40 is a cylindrical rod seal 41 which is mounted around the piston rod 18 and made from any suitable elastomeric or rubber-like material. As shown in FIG. 2, the upper peripheral edge of the rod seal 41 is chamfered as indicated by the numeral 43, and the inner peripheral edge around the bore through which the piston rod 18 extends is also chamfered, as indicated by the numeral 42a. As shown in FIG. 2, an annular V-shaped groove 43 is formed on the upper face of the rod seal 41, at a radial position evenly spaced between the chamfers 42 and 42a.

As shown in FIGS. 1 through 4, the numeral 44 designates the metering surface of the piston head 22. In the embodiment of FIGS. 1 through 4, the outer surface 44 is smooth and cylindrical. The metering area comprises the space between the piston head metering surface 44 and the surface of the inner chamber 34 in the inner tube 11, times the height of the piston head metering surface 44. The numeral 45 in FIG. 1 designates a lock nut by means of which the threaded outer tube 10 may be fixed in an operative position.

The numeral 47 in FIG. 1 designates the fluid which is used in the shock absorber. In FIG. 2, the numeral 47a designates the fluid which has been forced down through the metering orifice formed by the area between the piston head surface 44 and the surface of the inner chamber 34. The numeral 34a in FIG. 2 designates the lower chamber below the piston head 22 into which the fluid is forced during an operative shock absorbing stroke, as described more fully hereinafter.

The fluid 47 is injected into the inner tube 11 by removing the tube 11 from the outer tube 10 and filling the same while in an inverted position. The piston rod 18 is released from the outer tube end wall 13 so that the inner tube 11 may be removed. The snap ring 38 is then released so that the piston head 22 and the rod seal 41 may also be removed from the inner tube 11. With the inner tube 11 in an inverted or up-side-down position, the fluid 47 is poured into the inner tube 11 in a measured volume so that when the tube 11 is again assembled in the operative position shown in FIG. 1, there will be an air space or an air gap 49 in the upper end of the chamber 34 that corresponds or provides for a volume equal to the displacement or volume taken up by the rod 18 in the lower chamber 34a during an operative stroke. After the proper amount of fluid 47 has been inserted into the inner tube 11, the piston head 22 and the rod seal 41 are inserted in the inner tube 11 and fixed in place. The outer tube 10 is then slidably mounted over the inverted fluid filled tube 11 and the piston rod 18 secured in place by the screw 20.

It will be understood that the shock absorber may be built to any desired size for absorbing various shock loads. In use, the outer tube 10 is fixed in place by threading the same into a threaded bore in a support member in alignment with the impact load. FIG. 1 shows the shock absorber in the condition it assumes prior to being struck by a shock load indicated by the numeral 48. When an impact or shock load 48 strikes the inner tube head 35, the fluid 47 in the upper chamber 34 becomes pressurized and the check valve 30 is moved downwardly into the closed position shown in FIGS. 2 and 4 to close off the groove 50 and the upper ends of the return holes 28. The fluid 47 is then forced over the piston head 22 and down through the metering orifice or area between the piston outer surface 44 and the surface of the chamber 34. The fluid 47 is squeezed into the lower chamber 34a against the rod seal 41, and continued downward movement of the inner tube 11 moves the rod seal 41 downwardly therewith, and the volume of the lower chamber 34a increases as the rod seal 41 moves downwardly. The annular lip formed by the area between the chamfered outer periphery 42 and the annular groove 43 tends to be forced radially outward so as to provide a moving seal between the seal head 41 and the inner surface of the lower chamber 34a. The same sealing effect is provided against the piston rod 18 by the annular lip formed on the upper face of the rod seal 41 by the material between the annular groove 43 and the inner chamfer 42a.

When the shock load 48 has been absorbed, the return spring 39 then functions to force the inner tube 11 upwardly to the initial starting position shown in FIG. 1. During the return upward stroke, the fluid 47a in the lower chamber 34a is forced upwardly through the return passages 28. The return fluid pressure lifts the check valve 30 upwardly off its seat to a position shown in FIG. 1, so as to permit the fluid to be moved upwardly into the upper chamber 34. It will be understood that the length of the shock absorbing stroke can be adjusted by adjusting the position of the outer tube 10 relative to the inner tube 11. The adjustable stroke shock absorber of the present invention can be made to a small size for use in automation work for stopping moving parts of automation machinery.

By employing a non-Newtonian fluid for the fluid 47, a self-adjusting, variable orifice effect is provided by the non-mechanical means. Various types of suitable non-Newronian liquids are described in U.S. Pat. No. 3,489,087. However, it will be understood that other types of fluids can be used for the fluid 47, as for example, a fluid available on the market from Americal Motor Company and sold under the trademark "SYNTHOLUBE." "SYNTHOLUBE" oils are products formulated with polybutene as the basic ingredient, and polybutenes are butylene polymers which are composed of high molecular weight mono-olefins. Other suitable fluids may be used for the fluid 47. The resisting forces created by the shock absorber are constant regardless of the energy level absorbed, up to the capacity of the unit.

As shown in FIG. 1, a full stroke would be absorbed. However, if the outer tube 10, as shown in FIG. 1, were adjusted to an initial position upwardly from that shown in FIG. 1, then the shock absorber stroke would be shortened, since the shock absorber would start with an initial amount of fluid in the lower chamber 34a for the reception of the impact or shock load.

It will be seen that the space between the outer peripheral surface 44 of the piston head 22 and the surface of the chamber 34 provides a ring-shaped or annular metering orifice having an effective cross sectional area equivalent to the plan area of the ring-shaped space around the piston head.

FIGS. 5 through 19 show modified piston heads which may be employed in the invention. In these modified embodiments, the outer peripheral surfaces of the piston head are modified so as to provide various flow resistances to the fluid being forced down through the metering orifice or metering area between the piston head and the surface of the chamber 34. The modified embodiments of FIGS. 5 through 19 function to increase the effective metering orifice area over that provided by the piston head 22.

FIGS. 5 and 6 illustrate a modified piston head, and the parts corresponding to the parts of the piston head 22 are marked with the same reference numerals followed by the small letter a. The piston head surface 44a is provided with a plurality of longitudinally extended straight serrations which are formed so as to provide longitudinally extended triangular grooves. The piston head 22a of FIGS. 5 and 6 would increase the effective metering orifice area through which fluid 47 may pass from the upper chamber 34 downwardly to the lower chamber 34.

FIGS. 6 and 7 illustrate a second modified piston head, and the parts thereof which correspond to the parts of the piston head 22 are marked with the same reference numerals followed by the small letter b. In the embodiment of FIGS. 7 and 8, the outer piston head surface 44b is provided with a plurality of longitudinally extended semi-circular grooves which function to increase the effective metering orifice area between the piston head 22b and the inner surface of the chamber 34. The grooves are separated by longitudinal ribs having arcuate faces that all lie on a circle.

Figure 10:
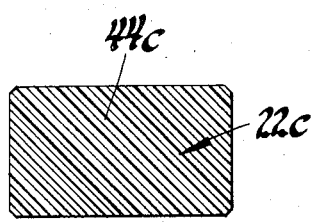
FIG. 10 is an elevational view of the piston head illustrated in FIG. 9, taken along the line 10—10 thereof, and looking in the direction of the arrows.

FIGS. 9 and 10 illustrate still another piston head, and the parts thereof which correspond to the parts of the piston head 22 are marked with the same reference numerals followed by the small letter c. In the embodiment of FIGS. 9 and 10, the piston head outer surface 44c is provided with straight serrated teeth which are slanted at a 45° angle relative to the longitudinal axis of the piston head. The serrations function to increase the effective metering orifice area between the piston head 22c and the inner surface of the chamber 34.

Figure 11:
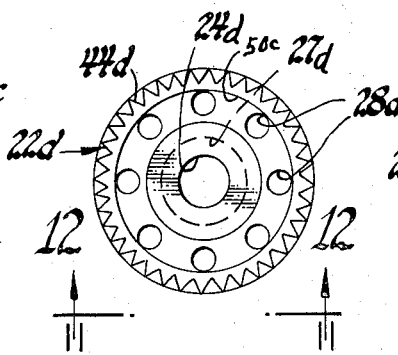
FIG. 11 is a top plan view of a further piston head employed in the invention.
Figure 12:
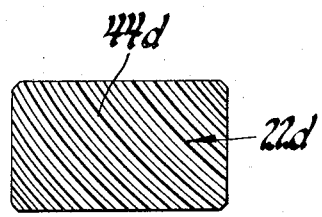
FIG. 12 is an elevational view of the piston head illustrated in FIG. 11, taken along the line 12—12 thereof, and looking in the direction of the arrows.

FIGS. 11 and 12 illustrate another modified piston head, and the parts thereof which are the same as the parts of the piston head 22 have been marked with the same reference numerals followed by the small letter d. In the embodiment of FIGS. 11 and 12, the piston head peripheral surface 44d has been provided with helical serrated teeth. The helical serrated teeth in the embodiment of FIGS. 11 and 12 function to increase the effective metering orifice area between the piston head 22d and the inner surface of the chamber 34.

Figure 15:
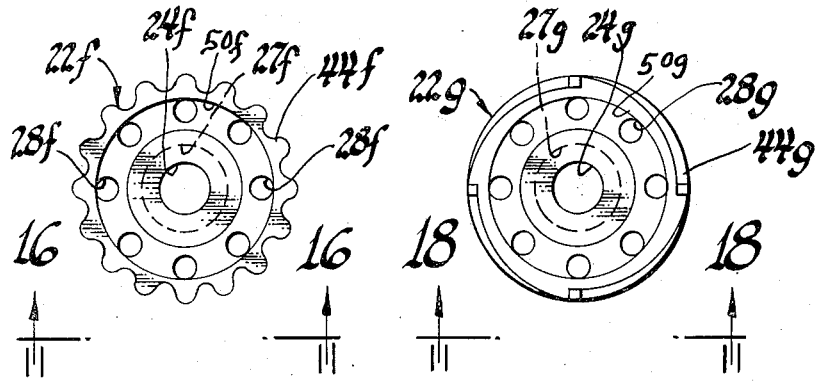
FIG. 15 is a top plan view of a further modified piston head employed in the invention.
Figure 16:
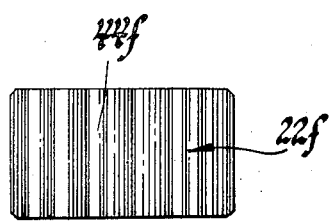
FIG. 16 is an elevational view of the piston head illustrated in FIG. 15, taken along the line 16—16 thereof, and looking in the direction of the arrows.

FIGS. 15 and 16 show still another modified piston head, and the parts thereof which correspond to the parts of the piston head 22 are marked with the same reference numerals followed by the small letter f. In the embodiment of FIGS. 15 and 16, the piston head peripheral surface 44f is provided with a plurality of circumferentially and evenly spaced, and longitudinally extended, straight arcuate passages which are separated by evenly spaced, longitudinally extended, rounded teeth. The embodiment of FIGS. 15 and 16 functions to increase the effective metering orifice area between the piston head 22f and the inner surface of the chamber 34.

Figure 13:
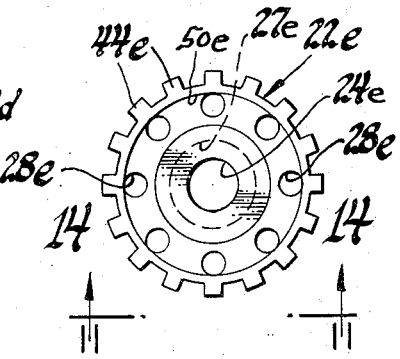
FIG. 13 is a top plan view of a still further modified piston head employed in the invention.
Figure 14:
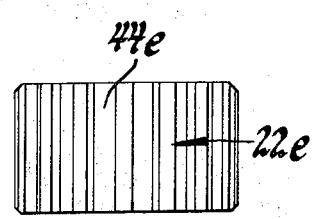
FIG. 14 is an elevational view of the piston head illustrated in FIG. 13, taken along the line 14—14 thereof, and looking in the direction of the arrows.

FIGS. 13 and 14 illustrate still another modified piston head, and the parts thereof which correspond to the parts of the piston head 22 are marked with the same reference numerals followed by the small letter e. In the embodiment of FIGS. 13 and 14, the piston head outer surface 44e is provided with a plurality of longidudinally extended straight serrations around the peripheral surface thereof, and with said serrations being semicircular in plan cross section, and with semi-circular ridges between said serrations which have outer edges that form a circle. The piston head outer surface 44e functions to increase the effective metering orifice area between the piston head 22e and the inner surface of the chamber 34.

Figure 17:
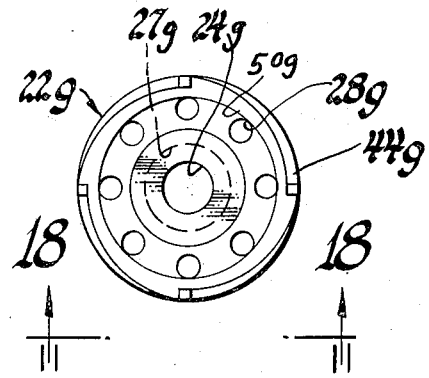
FIG. 17 is a top plan view of still another modified piston head employed in the invention.
Figure 18:
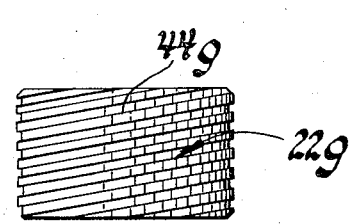
FIG. 18 is an elevational view of the piston head illustrated in FIG. 17, taken along the line 18—18 thereof, and looking in the direction of the arrows.

FIGS. 17 and 18 illustrate sill another modified piston head, and the parts thereof which correspond to the parts of the piston head 22 are marked with the same reference numerals followed by the small letter g. In the embodiment of FIGS. 17 and 18, the piston head outer surface 44g is formed by a plurality of screw threads, as for example Acme threads. The piston head outer surface 44g functions to increase the effective metering orifice area between the piston head 22g and the inner surface of the chamber 34.

Figure 19:
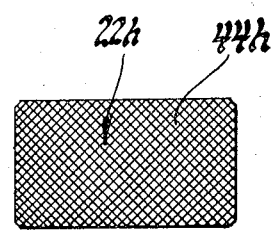
FIG. 19 is a side elevational view of still another modified piston head employed in the invention.

FIG. 19 illustrates the provision of an outer surface 44h on a still further modified piston head, wherein the outer surface is formed by two sets of opposite straight serrations which are disposed at 45° relative to the vertical axis so as to form a surface appearing as if it were knurled. The piston head embodiment of FIG. 19 functions to increase the effective metering orifice area over that provided by the piston head 22.

It will be seen that the shock absorber of the present invention provides a compact structure with a built-in accumulator.

While it will be apparent that the preferred embodiments of the invention herein disclosed are well calculated to fulfill the objects above stated, it will be appreciated that the invention is susceptible to modification, variation and change.

What is claimed is:

1. An adjustable stroke shock absorber comprising:
   a. an outer tube having a closed rear end and an open front end;
   b. an inner tube having an open rear end slidably mounted in the outer tube through the open front end thereof and having a closed front end for receiving a shock load extended outwardly of said outer tube and to form a closure end for a chamber in the inner tube;
   c. a piston rod disposed in said tubes with a rear end fixed to the closed rear end of said outer tube, and having a front end extended into the inner tube chamber;
   d. a piston head fixed on the front end of said piston rod and having the outer peripheral surface thereof spaced from the surface of the chamber in the inner tube to form a ring shaped metering orifice therebetween;
   e. a resilient rod seal slidably mounted about said piston rod on the rear end of said piston head;
   f. means for retaining said resilient rod seal in said inner tube;
   g. return passage means formed through said piston head to communicate the portion of the inner tube chamber in front of the piston head with the portion of the inner tube chamber behind the piston head;
   h. check valve means operatively mounted on the front end of said piston head and movable to a closed position over the outer end of said fluid passage means so as to blockflow therethrough, and to an open position spaced apart from the outer end of said passage means to allow flow therethrough;
   i. said inner tube chamber carrying a volume of fluid; and,
   j. return means operatively mounted in said outer tube for returning said inner tube from an inward position in the outer tube after a shock absorbing stroke to the initial shock absorbing position, whereby when the inner tube receives an impact load it moves into the outer tube and creates a fluid pressure on the check valve and moves it to the closed position and forces the fluid from the outer end of the inner tube chamber over the piston head and through the ring-shaped metering orifice between the piston head outer peripheral surface and the surface of the chamber in the inner tube and thence into the inner end of the inner tube chamber to the rear of the piston head, and when the inner tube reaches the end of the shock absorbing stroke, the return means moves the inner tube outwardly to the initial shock absorbing position.

2. An adjustable stroke shock absorber as defined in claim 1, wherein:
   a. said return means is a spring means.

3. An adjustable stroke shock absorber as defined in claim 1, wherein:
   a. said outer tube is provided with a vent passage for venting the rear portion of the outer tube behind the inner tube to the atmosphere.

4. An adjustable stroke shock absorber as defined in claim 1, wherein:
   a. said piston head is cylindrically shaped and provided with a smooth peripheral surface.

5. An adjustable stroke shock absorber as defined in claim 1, wherein:
   a. said piston head is cylindrically shaped and provided with a plurality of longitudinally extended straight serrations around the peripheral surface thereof, and with said serrations being triangular in plan cross section.

6. An adjustable stroke shock absorber as defined in claim 1, wherein:
   a. said piston head is cylindrically shaped and provided with a plurality of longitudinally extended straight serrations around the peripheral surface thereof, and with said serrations being semicircular in plan cross section, and with ridges between said serrations which have outer edges that form a circle.

7. An adjustable stroke shock absorber as defined in claim 1, wherein:
   a. said piston head is cylindrically shaped and provided with a plurality of straight serrated teeth around the peripheral surface thereof, and which teeth are slanted at a 45° angle relative to the longitudinal axis of the piston head.

8. An adjustable stroke shock absorber as defined in claim 1, wherein:
   a. said piston head is cylindrically shaped and provided with a plurality of helical serrated teeth around the peripheral surface thereof.

9. An adjustable stroke shock absorber as defined in claim 1, wherein:
   a. said piston head is cylindrically shaped and provided with a plurality of longitudinally extended straight serrations around the peripheral surface thereof, and with said serrations being rectangular in plan cross section, and with rectangular ridges between said serrations which have outer edges that form a circle.

10. An adjustable stroke shock absorber as defined in claim 1, wherein:
    a. said piston head is cylindrically shaped and provided with a plurality of longitudinally extended straight serrations around the peripheral surface thereof, and with said serrations being semi-circular in plan cross section, and with semi-circular ridges between said serrations which have outer edges that form a circle.

11. An adjustable stroke shock absorber as defined in claim 1, wherein:
    a. said piston head is cylindrically shaped and provided with a plurality of threads around the peripheral surface thereof.

12. An adjustable stroke shock absorber as defined in claim 1, wherein:
    a. said piston head is cylindrically shaped and provided with a knurled peripheral surface.

* * * * *

PO-1050
(5/69)

UNITED STATES PATENT OFFICE
CERTIFICATE OF CORRECTION

Patent No. 3,794,309        Dated February 26, 1974

Inventor(s) William J. Chorkey, Larry C. Ellis, Robert J. Heideman

It is certified that error appears in the above-identified patent and that said Letters Patent are hereby corrected as shown below:

On the Abstract page, the name of the first inventor has been misspelled: "William J. Chrokey" should be -- William J. Chorkey --.

Column 2, line 59, after "mounted", "with" should be -- within --.

Column 5, line 55, "non-Newronian" should be -- non-Newtonian --.

Column 5, line 58, "Americal" should be -- American --.

Signed and sealed this 11th day of June 1974.

(SEAL)
Attest:

EDWARD M. FLETCHER, JR.
Attesting Officer

C. MARSHALL DANN
Commissioner of Patents